United States Patent
Dhablania et al.

[11] Patent Number: 6,115,730
[45] Date of Patent: Sep. 5, 2000

[54] RELOADABLE FLOATING POINT UNIT

[75] Inventors: Atul Dhablania, Garland; Willard S. Briggs, Boulder, both of Tex.

[73] Assignee: VIA-Cyrix, Inc., Richardson, Tex.

[21] Appl. No.: 08/971,488

[22] Filed: Nov. 17, 1997

Related U.S. Application Data

[63] Continuation of application No. 08/608,068, Feb. 28, 1996, abandoned.

[51] Int. Cl.[7] .................... G06F 7/42; G06F 7/38
[52] U.S. Cl. .............................. 708/505; 708/501
[58] Field of Search ..................... 708/490, 495, 708/501, 505; 712/218, 222, 495

[56] References Cited

U.S. PATENT DOCUMENTS

| | | | |
|---|---|---|---|
| 4,435,765 | 3/1984 | Uchida et al. | 395/484 |
| 4,644,466 | 2/1987 | Saito | 395/394 |
| 4,757,440 | 7/1988 | Scheuneman | 395/185.06 |
| 5,073,891 | 12/1991 | Patel | 371/21.3 |
| 5,133,077 | 7/1992 | Karne et al. | 395/800 |
| 5,201,056 | 4/1993 | Daniel et al. | 395/800 |
| 5,303,354 | 4/1994 | Higuchi et al. | 395/394 |
| 5,404,552 | 4/1995 | Ikenaga | 395/800 |
| 5,467,476 | 11/1995 | Kawasaki | 395/800 |
| 5,509,130 | 4/1996 | Trauben et al. | 395/391 |
| 5,517,438 | 5/1996 | Dao-Trong et al. | 364/748 |
| 5,590,365 | 12/1996 | Ide et al. | 395/394 |
| 5,892,696 | 4/1999 | Kozu | 708/490 |

*Primary Examiner*—Tan V. Mai
*Attorney, Agent, or Firm*—Carr & Ferrell LLP

[57] ABSTRACT

A preloadable floating point unit includes first and second preload registers that hold a next operand and a next top of array (TOA) for use with a next FPU instruction held in an instruction queue pending completion of the current FPU instruction.

9 Claims, 5 Drawing Sheets

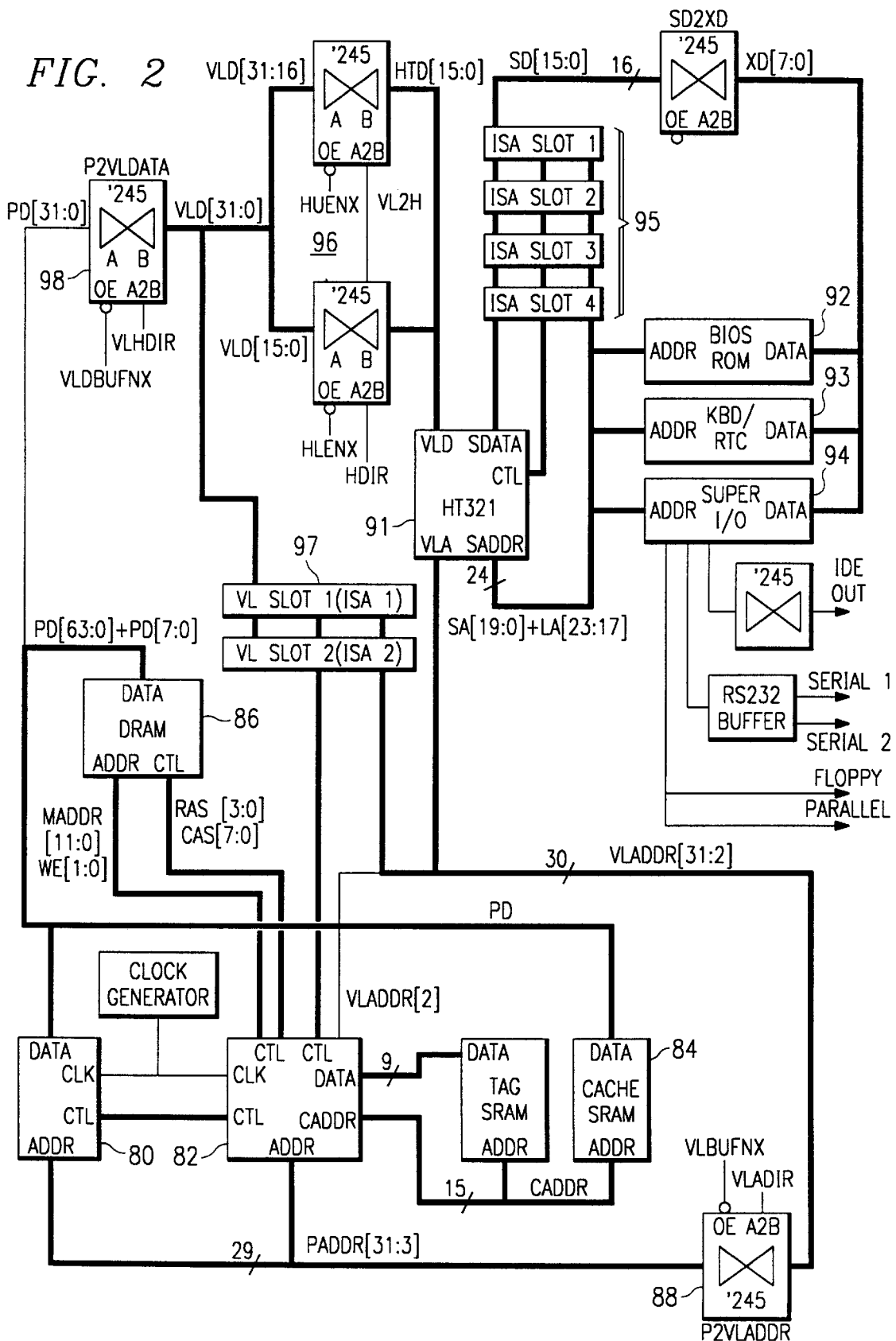

RELOADABLE FLOATING POINT UNIT

The present application is a file wrapper continuation of copending application Ser. No. 08/608,068, filed Feb. 28, 1996, now abandoned.

BACKGROUND OF THE INVENTION

1. Field of the Invention

The present invention generally relates to floating point units and, more particularly, to a floating point unit having preload registers for holding next operands to be used during execution of future instructions.

2. Description of Related Art

Floating point units (or "FPUS") which performing arithmetic operations such as add and multiply have long been known in the art. FPUs typically include a register array which holds both input operands and results. While operands are often imported into the FPU, the architecture for certain FPUs is structured such that arithmetic operations must include the input operand located at the top of the register array (or "TOA") as one of the operands. Upon completion of the arithmetic operation, the result is then written to the TOA.

While FPUs are not ordinarily provided with instruction queues capable of holding multiple floating point instructions, certain FPUs are provided with 2-deep instruction queues or, in some cases, 4-deep instruction queues, respectively capable of holding up to two or four floating point instructions issued to it by the CPU core via the load/store pipe stage. Since a next instruction can be issued to the FPU before the prior instruction has been completed, the 2-deep or 4-deep instruction queue has improved the pipelining of instructions to the FPU. However, regardless of whether an FPU is provided with an instruction queue, if an FPU's architecture is structured such that the execution of the next instruction requires the result written to the TOA at the completion of the prior instruction, queueing of instructions in an instruction queue does not always result in an improvement in performance by the FPU in executing its instructions.

One example of a microprocessor characterized by a register array architecture in which the result of arithmetic operations are written to the TOA is the X87 microprocessor. By exploiting this characteristic of the X87 architecture, decoded instructions being held by the 4-deep instruction queue may be used to enhance the performance of the X87 microprocessor if such a microprocessor was provided with preload registers for holding next operands such that a next instruction may be initiated before a prior instruction has finished.

Thus, it can be readily seen from the foregoing that it would be desirable to improve the performance of an FPU by providing it with preload registers which enable initiation of a next instruction held in a instruction queue. It is, therefore, the object of this invention to provide such an FPU.

SUMMARY OF THE INVENTION

The present invention is directed to a preloadable FPU characterized by enhanced performance by its ability to initiate a next instruction held in a 4-deep instruction queue before a prior instruction has finished. The preloadable FPU includes one or more arithmetic operation units such as an adder or multiplier having plural latched inputs. Coupled to the latched inputs of the arithmetic operation units are first and second preload registers. The first preload register holds a next operand (or NO) to be used during execution of the next instruction held in the instruction queue while the second preload register holds a next TOA (or NT) to be used during execution of the next instruction. During execution of each instruction, the first and second preload registers are updated with the NO and NT for the next instruction. The preloadable FPU also includes a state machine which checks the validity of the first and second preload registers based upon the contents of a series of register tags.

BRIEF DESCRIPTION OF THE DRAWING

The present invention may be better understood, and its numerous objects, features and advantages will become apparent to those skilled in the art by reference to the accompanying drawing, in which:

FIG. 2 illustrates a block diagram of a processor system which incorporates the microprocessor circuit of FIG. 1A;

DETAILED DESCRIPTION

The detailed description of an exemplary embodiment of the microprocessor of the present invention is organized as follows:

1. Exemplary Processor System
   1.1. Microprocessor
   1.2. System
2. Generalized Pipeline Architecture
3. Preloadable FPU This organizational table, and the corresponding headings used in this detailed description, are provided for the convenience of reference only. Detailed description of conventional or known aspects of the microprocessor are omitted as to not obscure the description of the invention with unnecessary detail.

1. Exemplary Processor System

Figure 1A:
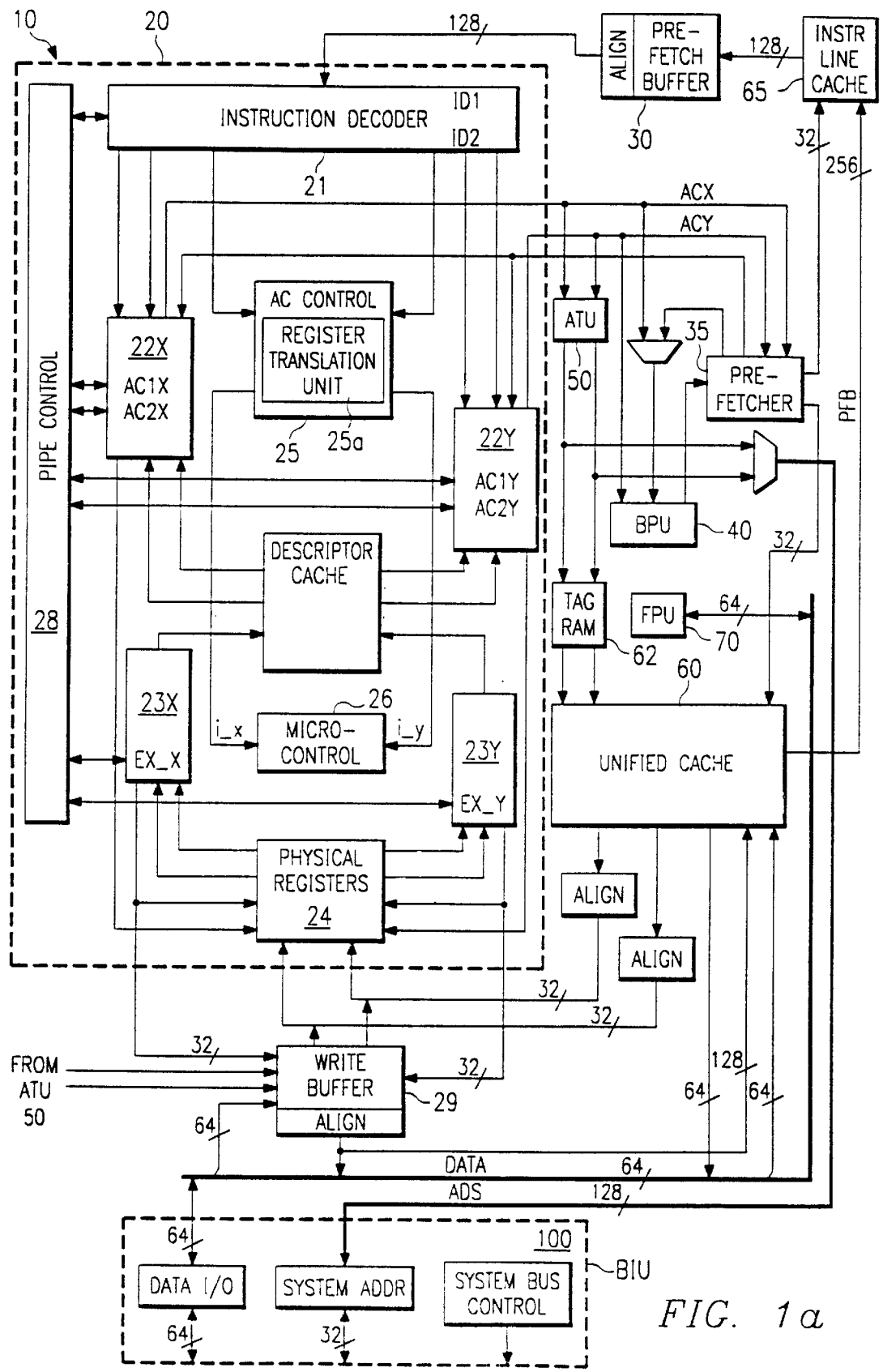
FIG. 1A illustrates a block diagram of a microprocessor circuit having a preloadable FPU constructed in accordance with the teachings of the present invention.
Figure 1B:
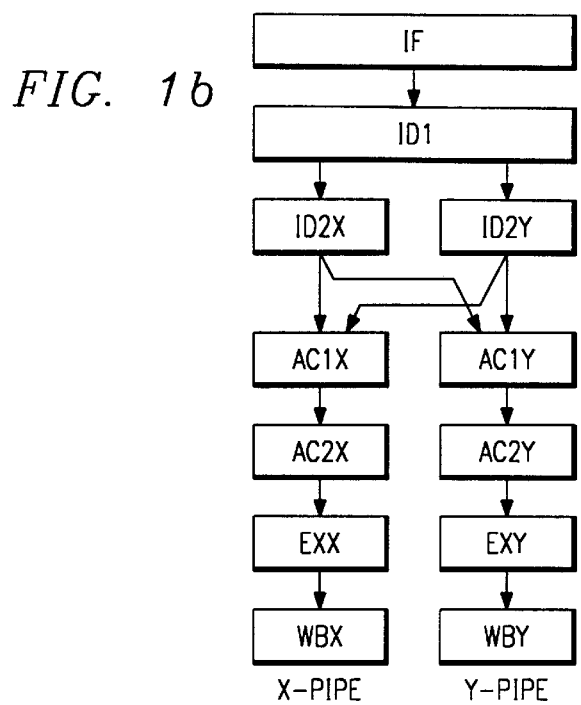
FIG. 1B illustrates a Generalized block diagram of the instruction pipeline stages for the microprocessor circuit illustrated in FIG. 1A.

The exemplary processor system is shown in FIGS. 1A, 1B, and 2. FIGS. 1A and 1B respectively illustrate the basic functional blocks of the exemplary superscalar, superpipelined microprocessor along with the pipe stages of the two execution pipelines. FIG. 2 illustrates an exemplary processor system (motherboard) design using the microprocessor.

1.1. Microprocessor

Referring to FIG. 1A, the major sub-blocks of a microprocessor 10 include:

(a) central processing unit (CPU) core 20;
(b) prefetch buffer 30;
(c) prefetcher 35;

(d) branch processing unit (BPU) 40;
(e) address translation unit (ATU) 50; and
(f) unified 16 Kbyte code/data cache 60, including TAG RAM 62.

A 256 byte instruction line cache 65 provides a primary instruction cache to reduce instruction fetches to the unified cache, which operates as a secondary instruction cache. An onboard floating point unit (FPU) 70 executes floating point instructions issued to it by the CPU core 20.

The microprocessor uses internal 32-bit address and 64-bit data buses ADS and DATA, respectively. A 256 bit (32 byte) prefetch bus (PFB), corresponding to the 32 byte line size of the unified cache 60 and the instruction line cache 65, allows a full line of 32 instruction bytes to be transferred to the instruction line cache in a single clock. Interface to external 32 bit address and 64 bit data buses is through a bus interface unit (BIU).

The CPU core 20 is a superscalar design with two execution pipes X and Y. It includes an instruction decoder 21, address calculation units 22X and 22Y, execution units 23X and 23Y, and a register file 24 with 32 32-bit registers. An AC control unit 25 includes a register translation unit 25a with a register scoreboard and register renaming hardware. A microcontrol unit 26, including a microsequencer and microROM, provides execution control.

Writes from CPU core 20 are queued into twelve 32 bit write buffers 29—write buffer allocation is performed by the AC control unit 25. These write buffers provide an interface for writes to the unified cache 60—noncacheable writes go directly from the write buffers to external memory. The write buffer logic supports optional read sourcing and write gathering.

A pipe control unit 28 controls instruction flow through the execution pipes, including: keeping the instructions in order until it is determined that an instruction will not cause an exception; squashing bubbles in the instruction stream; and flushing the execution pipes behind branches that are mispredicted and instructions that cause an exception. For each stage, the pipe control unit keeps track of which execution pipe contains the earliest instruction, provides a "stall" output, and receives a "delay" input.

BPU 40 predicts the direction of branches (taken or not taken), and provides target addresses for predicted taken branches and unconditional change of flow instructions (jumps, calls, returns). In addition, it monitors speculative execution in the case of branches and floating point instructions, i.e., the execution of instructions speculatively issued after branches which may turn out to be mispredicted, and floating point instructions issued to the FPU which may fault after the speculatively issued instructions have completed execution. If a floating point instruction faults, or if a branch is mispredicted (will not be known until the EX or WB stage for the branch), then the execution pipeline must be repaired to the point of the faulting or mispredicted instruction (i.e., the execution pipeline is flushed behind that instruction), and instruction fetch restarted.

Pipeline repair is accomplished by creating checkpoints of the processor state at each pipe stage as a floating point or predicted branch instruction enters that stage. For these checkpointed instructions, all resources (programmer visible registers, instruction pointer, conditional code register) that can be modified by succeeding speculatively issued instructions are checkpointed. If a checkpointed floating point instruction faults or a checkpointed branch is mispredicted, the execution pipeline is flushed behind the checkpointed instruction—for floating point instructions, this will typically mean flushing the entire execution pipeline, while for a mispredicted branch there may be a paired instruction in EX and two instructions in WB that would be allowed to complete.

For the exemplary microprocessor 10, the principle constraints on the degree of speculation are: (a) speculative execution is allowed for only up to four floating point or branch instructions at a time (i.e., the speculation level is maximum 4), and (b) a write or floating point store will not complete to the cache or external memory until the associated branch or floating point instruction has been resolved (i.e., the prediction is correct, or floating point instruction does not fault).

The unified cache 60 is a 4-way set associative (with a 4k set size), using a pseudo-LRU replacement algorithm, with write-through and write-back modes. It is dual ported (through banking) to permit two memory accesses (data read, instruction fetch, or data write) per clock. The instruction line cache is a fully associative, lookaside implementation (relative to the unified cache), using an LRU replacement algorithm.

The FPU 70 includes a load/store stage with 4-deep load and store queues, a conversion stage (32-bit to 80-bit extended format), and an execution stage. Loads are controlled by the CPU core 20, and cacheable stores are directed through the write buffers 29 (i.e., a write buffer is allocated for each floating point store operation).

Referring to FIG. 1B, the microprocessor has seven-stage X and Y execution pipelines: instruction fetch IF), two instruction decode stages (ID1, ID2), two address calculation stages (AC1, AC2), execution (EX), and write-back (WB). Note that the complex ID and AC pipe stages are superpipelined.

The IF stage provides a continuous code stream into the CPU core 20. The prefetcher 35 fetches 16 bytes of instruction data into the prefetch buffer 30 from either the (primary) instruction line cache 65 or the (secondary) unified cache 60. BPU 40 is accessed with the prefetch address, and supplies target addresses to the prefetcher for predicted changes of flow, allowing the prefetcher to shift to a new code stream in one clock.

The decode stages ID1 and ID2 decode the variable length X86 instruction set. The instruction decoder 21 retrieves 16 bytes of instruction data from the prefetch buffer 30 each clock. In ID1, the length of two instructions is decoded (one each for the X and Y execution pipes) to obtain the X and Y instruction pointers—a corresponding X and Y bytes-used signal is sent back to the prefetch buffer (which then increments for the next 16 byte transfer). Also in ID1, certain instruction types are determined, such as changes of flow, and immediate and/or displacement operands are separated. The ID2 stage completes decoding the X and Y instructions, generating entry points for the microROM and decoding addressing modes and register fields.

During the ID stages, the optimum pipe for executing an instruction is determined, and the instruction is issued into that pipe. Pipe switching allows instructions to be switched from ID2X to AC1Y, and from ID2Y to AC1X. For the exemplary embodiment, certain instructions are issued only into the X pipeline: change of flow instructions, floating point instructions, and exclusive instructions. Exclusive instructions include: any instruction that may fault in the EX pipe stage and certain types of instructions such as protected mode segment loads, string instructions, special register access (control, debug, test), Multiply/Divide, Input/Output, Push All/Pop All (PUSH/POPA), and task switch. Exclusive instructions are able to use the resources of both pipes because they are issued alone from the ID stage (i.e., they are not paired with any other instruction). Except for these issue constraints, any instructions can be paired and issued into either the X or Y pipe.

The address calculation stages AC1 and AC2 calculate addresses for memory references and supply memory operands. The AC1 stage calculates two 32 bit linear (three operand) addresses per clock (four operand addresses, which are relatively infrequent, take two clocks). Data dependencies are also checked and resolved using the register translation unit 25a (register scoreboard and register renaming hardware)—the 32 physical registers 24 are used to map the 8 general purpose programmer visible logical registers defined in the X86 architecture (EAX, EBX, ECX, EDX, EDI, ESI, EBP, ESP).

The AC unit includes eight architectural (logical) registers (representing the X86 defined register set) that are used by the AC unit to avoid the delay required to access in AC1 the register translation unit before accessing register operands for address calculation. For instructions that require address calculations, AC1 waits until the required data in the architectural registers is valid (no read after write dependencies) before accessing those registers. During the AC2 stage, the register file 24 and the unified cache 60 are accessed with the physical address (for cache hits, cache access time for the dual ported unified cache is the same as that of a register, effectively extending the register set)—the physical address is either the linear address, or if address translation is enabled, a translated address generated by the ATU 50.

Translated addresses are generated by the ATU 50 from the linear address using information from page tables in memory and workspace control registers on chip. The unified cache is virtually indexed and physically tagged to permit, when address translation is enabled, set selection with the untranslated address (available at the end of AC1) and, for each set, tag comparison with the translated address from the ATU 50 (available early in AC2). Checks for any segmentation and/or address translation violations are also performed in AC2.

Instructions are kept in program order until it is determined that they will not cause an exception. For most instructions, this determination is made during or before AC2—floating point instructions and certain exclusive instructions may cause exceptions during execution. Instructions are passed in order from AC2 to EX (or in the case of floating point instructions, to the FPU)—because integer instructions that may still cause an exception in EX are designated exclusive, and therefore are issued alone into both execution pipes, handling exceptions in order is ensured.

The execution stages EXX and EXY perform the operations defined by the instruction. Instructions spend a variable number of clocks in EX, i.e., they are allowed to execute out of order (out of order completion). Both EX stages include adder, logical, and shifter functional units, and in addition, the EXX stage contains multiply/divide hardware.

The WB stage updates the register file 24, condition codes, and other parts of the machine state with the results of the previously executed instruction. The register file is written in Phase 1 (PH1) of WB and read in Phase 2 (PH2) of AC2.

1.2. System

Referring to FIG. 2 for the exemplary embodiment, microprocessor 10 is used in a processor system that includes a single chip memory and bus controller 82. The memory/bus controller 82 provides the interface between the microprocessor and the external memory subsystem—level two cache 84 and main memory 86—controlling data movement over the 64 bit processor data bus PD (the data path is external to the controller which reduces its pin count and cost).

Controller 82 interfaces directly to the 32-bit address bus PADDR, and includes a one bit wide data port (not shown) for reading and writing registers within the controller. A bi-directional isolation buffer 88 provides an address interface between microprocessor 10 and VL and ISA buses.

Controller 82 provides control for the VL and ISA bus interface. A VL/ISA interface chip 91 (such as an HT321) provides standard interfaces to a 32 bit VL bus and a 16 bit ISA bus. The ISA bus interfaces to BIOS 92, keyboard controller 93, and I/O chip 94, as well as standard ISA slots 95. The interface chip 91 interfaces to the 32 bit VL bus through a bi-directional 32/16 multiplexer 96 formed by dual high/low word [31:16]/[15:0] isolation buffers. The VL bus interfaces to standard VL slots 97, and through a bi-directional isolation buffer 98 to the low double word [31:0] of the 64 bit processor data (PD) bus.

2. Generalized Pipeline Architecture

Figure 3:
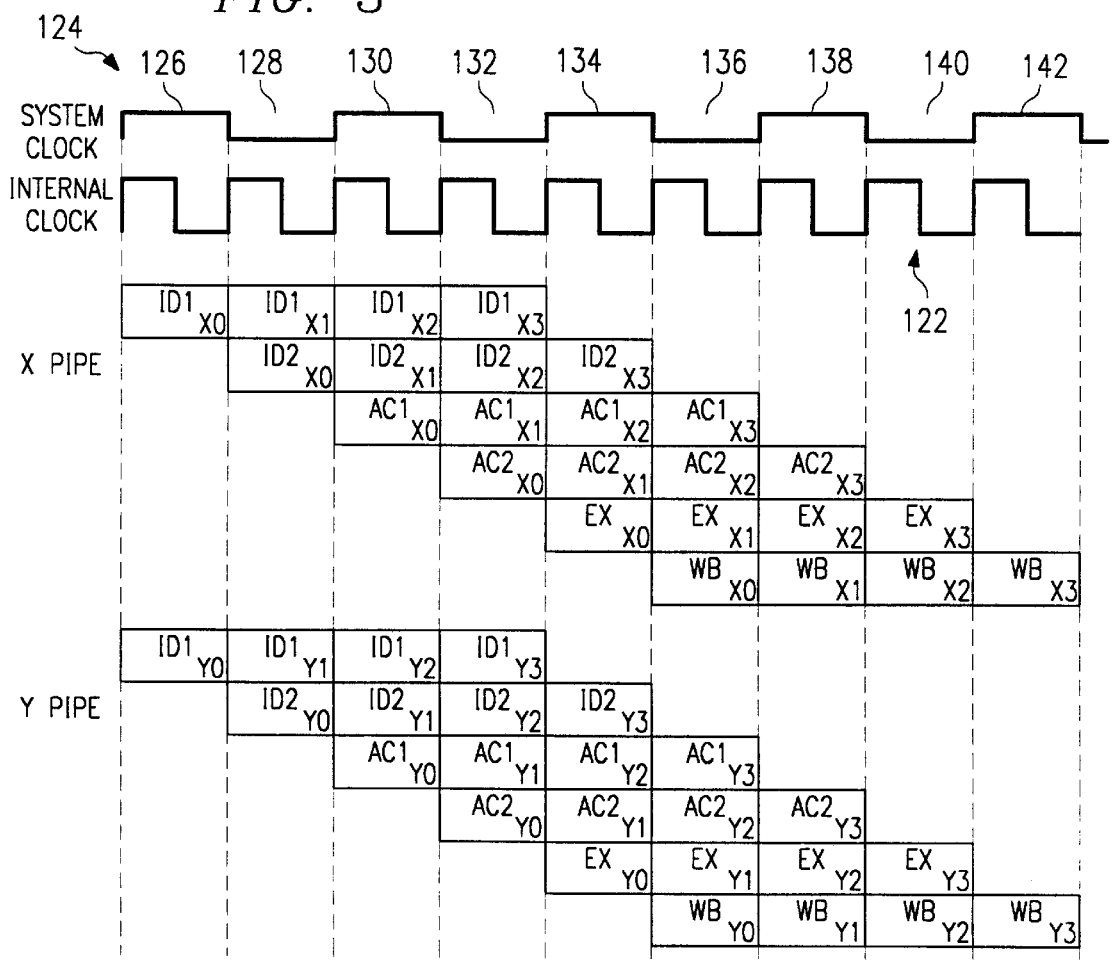
FIG. 3 illustrates a timing diagram for the flow of instructions through the pipeline stages of FIG. 1B.

FIG. 3 illustrates the flow of four instructions per pipeline, showing the overlapping execution of the instructions, for a two pipeline architecture. Additional pipelines and additional stages for each pipeline could also be provided. In the preferred embodiment, the microprocessor 10 uses an internal clock 122 which is a multiple of the system clock 124. In FIG. 3, the internal clock is shown as operating at two times the frequency of the system clock. During the first internal clock cycle 126, the ID1 stage operates on respective instructions X0 and Y0. During internal clock cycle 128, instructions X0 and Y0 are in the ID2 stage (X0 being in ID2x and Y0 being in ID2y) and instructions X1 and Y1 are in the ID1 stage. During internal clock cycle L30, instructions X2 and Y2 are in the ID1 stage, instructions X1 and Y1 are in the ID2 stage (X1 being in ID2x and Y1 being in ID2y) and instructions X0 and Y0 are in the AC1 stage (X0 being in AC1x and Y0 being in AC1y). During internal clock cycle 132, instructions X3 and Y3 are in the ID1 stage, instructions X2 and Y2 are in the ID2 stage, instructions X1 and Y1 are in the AC1 stage and instructions X0 and Y0 are in the AC2 stage. The instructions continue to flow sequentially through the stages of the X and Y pipelines. As shown in clocks 134–140, the execution portion of each instruction is performed on sequential clock cycles. This is a major advantage of a pipelined architecture—the number of instructions completed per clock is increased, without reducing the execution time of an individual instruction. Consequently, a greater instruction throughput is achieved with greater demands on the speed of the hardware.

The instruction flow shown in FIG. 3 is the optimum case. As shown, each pipe stage completes on time and no stage requires more than one clock cycle. In an actual machine, however, one or more stages may require additional clock cycles to complete, thereby changing the flow of instructions through the other pipe stages. Furthermore, the flow of instructions through one pipeline may be dependent upon the flow of instructions through the other pipeline.

A number of factors may cause delays in various stages of one or all of the pipelines. For example, an access to memory may miss in the memory cache, thereby preventing access of the data in the time required to process the instruction in one clock. This would require that either, or both, sides of the AC1 stage to delay until the data was retrieved from main memory. For a particular stage, other stages of the pipeline may be using a needed resource, such as a multiplier, which is only in one of the execution stages in the illustrated embodiment. In this case, the stage must delay until the resource is available. Data dependencies can also cause delays. If an instruction needs the result from a previous instruction, such as an ADD, it must wait until that instruction is processed by the execution unit.

Other delays are caused by "multi-box" instructions; i.e., instructions which are implemented using multiple microinstructions, and therefore require more than one clock cycle to complete. These instructions stop the flow of subsequent instructions through the pipeline at the output of the ID2 stage.

The flow of instructions through the pipeline is controlled by the pipe control unit 28. In the preferred embodiment, a single pipe control unit 28 is used to control the flow of instructions through both (or all) of the pipes. To control the flow of instructions through the pipes, the pipe control until 28 receives "delay" signals from the various units comprising the pipelines 102 and 104, and issues "stall" signals to the various units.

Although a single pipe control unit 28 is used for both X and Y pipelines, the pipelines themselves are controlled independent of one another. In other words, a stall in the X pipeline does not necessarily cause a stall in the Y pipeline.

3. Preloadable FPU

Figure 4A:
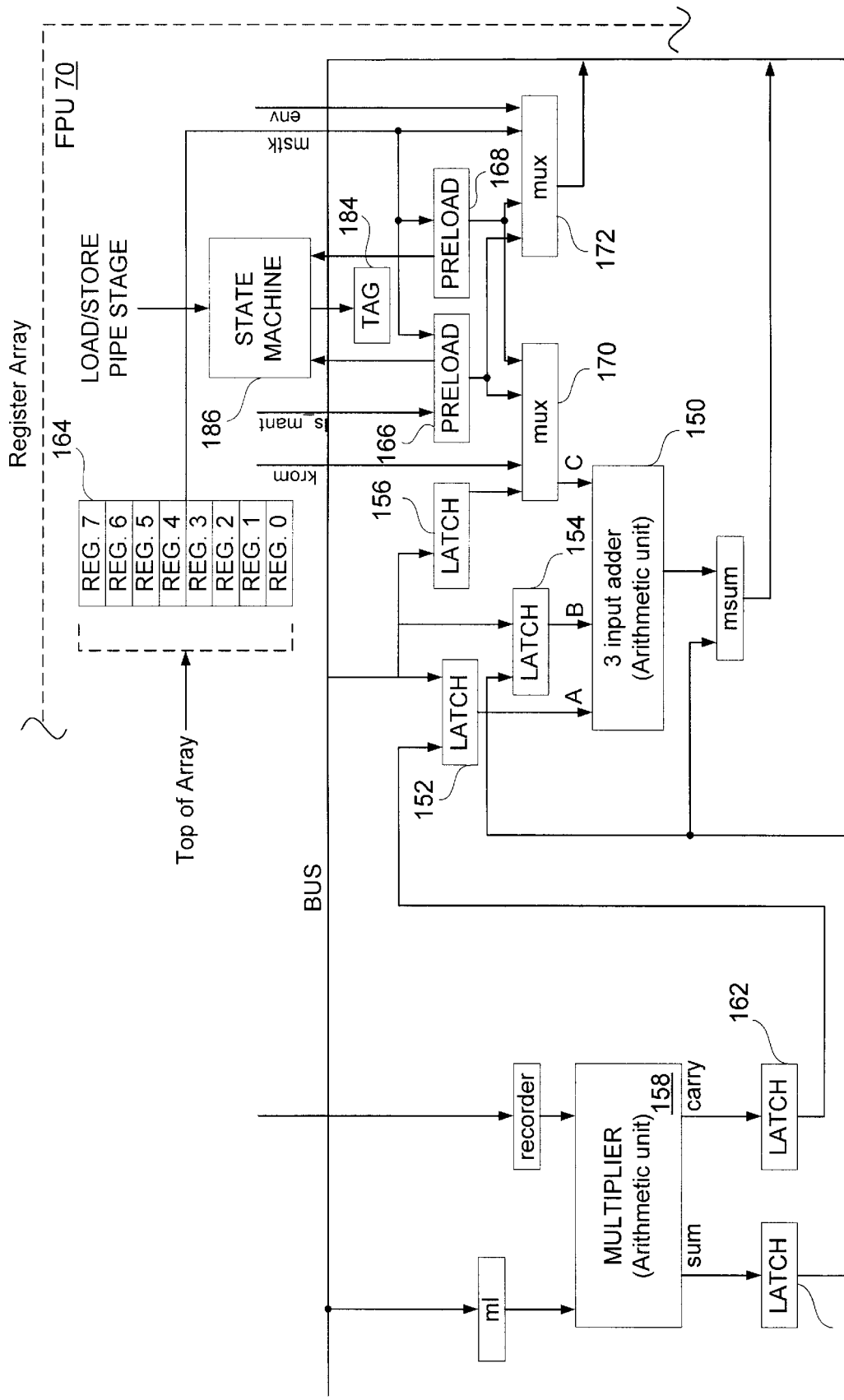
FIG. 4A is a simplified block diagram of a first portion of the preloadable FPU of FIG. 1.

Referring now to FIG. 4A, a preloadable FPU 70 located within the microprocessor 10 and constructed in accordance with the teachings of the present invention will now be described in greater detail. It should be noted that only that portion of the preloadable FPU 70 necessary to fully describe the invention is shown in FIG. 4A and that other portions of the preloadable FPU 70 have been omitted for ease of illustration.

The portion of the preloadable FPU 70 illustrated in FIG. 4A is within the mantissa data path, i.e., that part of the preloadable FPU 70 used to calculate the mantissa of a result of an arithmetic operation. One portion of the preloadable FPU 70 not illustrated in FIG. 4 is that part of the preloadable FPU 70 within the exponent data path, i.e., that portion of the preloadable FPU 70 used to calculate the exponent of a result of an arithmetic operation. It should be noted, however, that the exponent data path will also include plural preload registers, similar to those described below with respect to the mantissa data path, for holding next operands to be used during execution of future instructions.

The preloadable FPU 70 includes plural arithmetic operation units, one of which is a three input adder 150 having a latch 152, 154 and 156 at each input thereto. During an add operation using the three input adder 150, input operands, whether originating from an output latch 160 or 162 of a multiplier 158, an array 164 of registers 164 or another location not illustrated in FIG. 4, are held in selected ones of the latches 152, 154 and 156 before being propagated into the three input adder 150.

The preloadable FPU 70 further includes first and second preload registers 166 and 168. The first preload register 166, hereafter referred to as the "Next Operand" (or "NO") preload register 166, may receive data from decoded instructions via line ls_mant or from the array 164 of registers via line mstk. The second preload register 168, hereafter referred to as the "Next TOA" (or "NT") preload register 168, may only receive data from the array 164 of registers. The output of both the NO preload register 166 and the NT preload register 168 are provided as inputs to multiplexer 170 and multiplexer 172. Thus, the contents of the NO preload register 166 may be propagated to the three input adder 150 as either input A (via the multiplexer 172, the mbus and the latch 152), input B (via the multiplexer 172, the mbus and the latch 154) or input C (via the multiplexer 170). The contents of the NT preload register 168 may be similarly propagated to the three input adder 150 as either input A, B or C. Finally, the contents of the NO preload register 166 and the NT preload register 168 may be propagated to the multiplier 158 for use in a multiply operation via the mbus.

Figure 5:
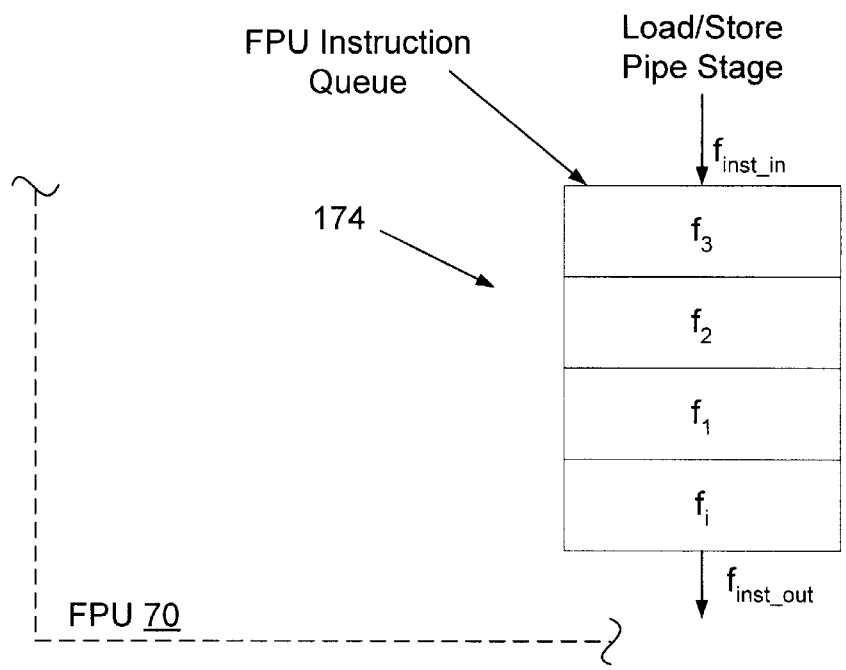
FIG. 5 is a simplified block diagram of a second portion of the preloadable FPU of FIG. 1.

Referring momentarily to FIG. 5, the preloadable FPU 70 further includes a 4-deep instruction queue 174 capable of holding up to four floating point instructions issued to the load store pipe by the CPU core 20. However, at least one operand for a floating point instruction comes from the TOA of the array 164 of registers and since the result of a floating point instructions is always written to the TOA of the array 164 of registers, absent the preload technique disclosed herein, the availability of multiple floating point instructions in the instruction queue 172 provides little benefit to speeding execution of instructions by the FPU 70.

Broadly speaking, during the execution of each instruction, the contents of the NO and NT preload registers 166 and 168 are updated by examining a next decoded instruction held in the instruction queue 174 and writing NO and NT for the next instruction to the NO and NT preload registers 166 and 168, respectively. NT is always taken from the register, included in the array 164 of registers, which will be set to TOA during execution of the next instruction. If the next decoded instruction is a load instruction, data accompanying the load instruction is written to TOA-1 and the NT preload register 168 as the value of NT. Depending on the next instruction, NO may be taken from the array 164 of registers or from memory, i.e., NO is included in the next instruction.

How this technique enhances performance of the preloadable FPU 70 will become clearer by the following examples of how the NO and NT preload registers 166 and 168 may be used in conjunction with the floating point instructions stored in the instruction queue 172 to speed the execution of instructions by the FPU 70.

The first example is relatively simple. Presume that the instruction queue 174 contains two floating point add instructions $f_1$ and $f_2$ as set forth below:

$f_1$[memdata1] TOA←TOA+memdata1; and $f_2$[memdata2] TOA←TOA+memdata2.

As instruction 2 requires the TOA written back to the array 164 of registers as the result of the add executed in instruction 1, instruction 2 is dependent on instruction 1. Thus, instruction 2 cannot be executed until after instruction 1 is completed and the result written to the TOA, thereby delaying execution of instruction 2.

This delay may be prevented by use of the NO preload register 166 and the NT preload register 168. Specifically, when TOA and memdata1 are provided to the adder 150, memdata2 is placed in the NO preload register 166. Then, when TOA and memdata1 have been added, the result is written to the NT preload register 168 as well as to the TOA of the array 164 of registers. Without the NO and NT preload registers 166 and 168, the FPU 70 would have to begin execution of instruction 2 by setting the TOA, writing memdata2 to the TOA and accessing the data from the array of registers needed to perform the instruction. Now, however, TOA and memdata2 are already latched for placement in the adder 150 and instruction 2 is ready for execution.

The next example illustrates, using a series of typical floating point instructions, how the NO and NT preload registers 166 and 168 are useful to optimize the forwarding of operands to arithmetic operation units such as the adder L 50. Presume that the following series floating point instructions are pipelined through the instruction queue 174:

$f_{init}$ TOA=0

$f_{load}$ memdata1 TOA=7, Reg7←Memdata1;

$f_{add}$ memdata2 TOA=7, Reg7←Reg7+Memdata1;

$f_{load}$ memdata3 TOA=6, Reg6←Memdata3;

$f_{addreg}$ 0 0 TOA=6, Reg6←Reg6+Reg6; and $f_{addreg}$ 0 1 TOA=6, Reg6←Reg6+Reg7.

The first floating point instruction is an initialization command which sets the TOA to register 0. Since the next instruction has already been decoded and the preloadable FPU 70 has been provided with NO and NT preload registers 166 and 168, the next operand NO and the next TOA NT are placed in the NO and NT preload registers 166 and 168. Thus, prior to execution of the $f_{load}$ instruction, memdata1 is written to the first preload register 166 and register 7, to which TOA will be set during execution of the $f_{load}$ instruction, is written to the NT preload register 168.

The next instruction to be executed is a first $f_{load}$ instruction. In executing this instruction, the TOA is set to register 7 and memdata 1 is written to register 7. As before, the preloadable FPU 70 looks ahead to the next decoded instruction, the $f_{add}$ instruction, and writes the next operand NO, Memdata2, to the NO preload register 166 and the next TOA, register 7, to the NT preload register 168. Generally, use of the NO and NT preload registers 166 and 168 improve the performance of the preloadable FPU 70 where the next instruction requires the preloaded operands. As the $f_{load}$ instruction did not require the preloaded operands, use of the NO and NT preload registers 166 and 168 have not speeded the operation of the preloadable FPU 70. Instead, since the previously preloaded operands are not needed, this second preloading of the NO and NT preload registers 166 and 168 merely overwrites the prior preload thereof.

Upon execution of the $f_{add}$ instruction, the TOA is set to register 7, the contents of Memdata2 and register 7 are to be written to the adder 150 and an add operation performed. However, rather then waiting for the TOA to be set to register 7 before writing memdata2 and register 7 to the adder 150 and performing the add, the input operands, memdata2 and register 7 are already latched in the NO and NT preload registers 166 and 168, respectively. Thus, the adder 150 is able to execute the instruction as soon as it is available and not wait for the TOA to be set to register 7 and for input operands mendata2 and register 7 to be written to the adder 150. By doing so, the execution of the add instruction may begin earlier, thereby improving performance of the preloadable FPU 70.

Arithmetic operations such as the add operation being performed by the preloadable FPU 70 are relatively time consuming. Thus, while the add instruction is executing, the preloadable FPU 70 again examines a next decoded instruction which, in the present example, is a second $f_{load}$ instruction, and writes memdata3 to the NO preload register 166 and the contents of register 6, to which the TOA will be set upon execution of the second $f_{load}$ instruction, to the NT preload register 168. When the add instruction is completed, execution of the second $f_{load}$ instruction begins. In executing this instruction, the TOA is set to register 6 and memdata3 is written to register 6. As with the first $f_{load}$ instruction, preloading of the operands for the second $f_{load}$ instruction does not improve performance of the preloadable FPU 70 since execution of the second $f_{load}$ instruction did not include an arithmetic operation to be performed using the preloaded operands.

Again, the preloadable FPU 70 looks ahead to the next decoded instruction. The next instruction is now an add operation using the registers of the array 164 of registers. The instruction further indicates that the two operands are "0" and "0". Rather than meaning that register 0 is to be added to itself, this instruction means that the TOA is to be added to itself. As the add register instruction sets the TOA to register 6, the preloadable FPU 70 writes register 6 to both the NO and NT preload registers 166 and 168.

Upon execution of the $f_{addreg}$ instruction, the TOA is set to register 6, the contents of register 6 are written to first and second inputs of the adder 150 and an add operation performed. However, rather then waiting for the TOA to be set to register 6 before writing register 6 to first and second inputs of the adder 150 and performing the add, the input operands, register 6 and register 6 are already latched in the NO and NT preload registers 166 and 168, respectively. Thus, the adder 150 is able to execute the instruction as soon as it is available and not wait for the TOA to be set to register 6 and for input operands register 6 and register 6 to be written to the adder 150. By doing so, the execution of the add instruction may begin earlier, thereby improving performance of the preloadable FPU 70.

As the first $f_{addreg}$ instruction is being executed, the preloadable FPU 70 looks ahead to the next decoded instruction, a second $f_{addreg}$ instruction. The second $f_{addreg}$ instruction is an add operation using operands, "0" and "1", i.e., the TOA and TOA+1. However, since the result of the first $f_{addreg}$ instruction is to be written to the TOA, the operands for the second $f_{addreg}$ instruction will not be known until after execution of the first $f_{addreg}$ instruction is complete and the result written to register 6. Thus, without the advantages provided by use of the NO and NT preload registers 166 and 168, execution of the second $f_{addreg}$ instruction must await both completion of the first $f_{addreg}$ instruction and a write of the result to register 6. As adds can be time consuming, this delay may significantly affect performance of the preloadable FPU 70. Rather than await the result of the first $f_{addreg}$ instruction to be written to register 6, register 7 is written to the NO preload register 166 and the result of the first $f_{addreg}$ instruction is simultaneously written to register 6 and the NT preload register 168.

Without the NO and NT preload registers 166 and 168, a conventionally configured FPU would now be ready to begin execution of the second $f_{addreg}$ instruction by setting the TOA to register 6 and writing registers 6 and 7 to first and second inputs of the adder. However, in the preloadable FPU 70, register 6 and register 7 are already latched for placement in the adder 150. Accordingly, execution of the second $f_{addreg}$ instruction can begin without the delays caused by setting the TOA and writing registers 6 and 7 to the adder 150.

The final example illustrates how the NO and NT preload registers 166 and 168 may be used to cycle steal, i.e., eliminate a full cycle from time period required to execute a series of floating point instructions. Cycle stealing is possible whenever the instruction queue 174 contains a load operation interspersed between a pair of adds, thereby enabling the preloadable FPU 70 to simultaneously execute the first add instruction and the load instruction. Presume, that the instruction queue 174 may contain the following decoded floating point instructions:

$f_{add}$ memdata1 TOA=7, Reg7←Reg7+memdata1;

$f_{load}$ memdata2 TOA=6, Reg6←memdata2; and $f_{addreg}$ 0 1 TOA=6, Reg6←Reg6+Reg7.

To steal a cycle, the $f_{load}$ instruction must be completed no later than the $f_{add}$. This enables the $f_{addreg}$ instruction to begin execution as soon as the $f_{add}$ instruction clears the adder 150. To do so, memdata2 is written to the NO preload register 166 while the adder 150 is adding memdata1 and reg7, thereby clearing the $f_{load}$ instruction. The result of the add operation is written to both reg7 and the NT preload register 168. Execution of the $f_{addreg}$ instruction may then begin as soon as the $f_{add}$ instruction clears the adder 150.

The examples set forth above represent a somewhat simplified discussion of possible uses of the NO and NT preload registers 166 and 168 in enhancing performance of the preloadable FPU 70. In the foregoing description, it was presumed that the data to be written to the NO and NT registers 166 and 168 was always valid and available. Specifically, prior to execution of a next floating point instruction, a next operand and a next TOA were written to the NO and NT preload registers 166 and 168. However, depending on the particular instructions to be executed, the next operand and/or the next TOA may not be available.

Figure 4B:
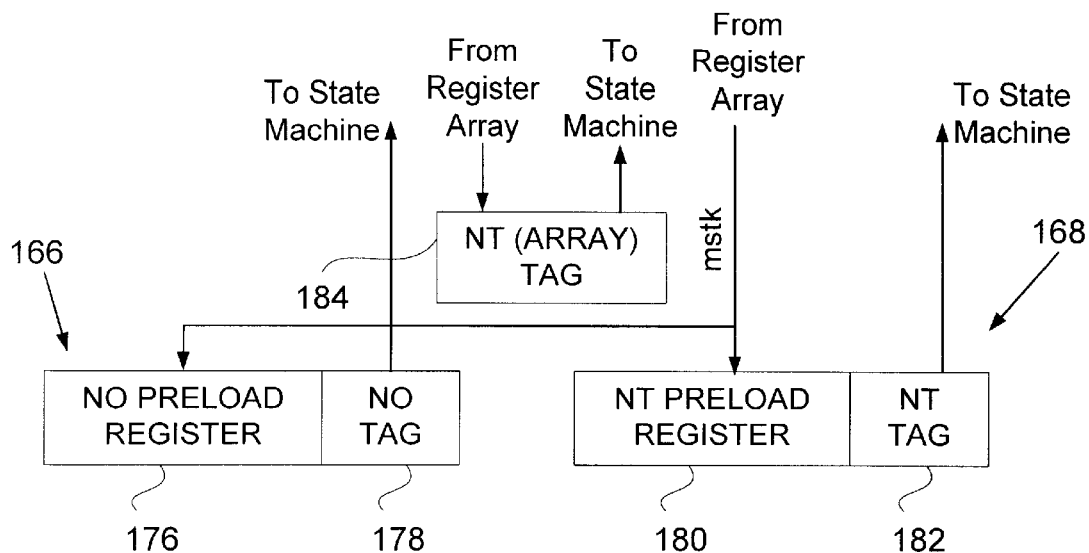
FIG. 4B is an expanded block diagram of a portion of FIG. 4A.

Referring now, in conjunction, to FIGS. 4A and 4B, state machine 186 ensures validity of data written to the NO and NT preload registers 166 and 168. As may now be seen, the NO preload register 166 is actually comprised of NO preload register 176 and NO tag 178. Similarly, NT preload register 168 is actually comprised of NT preload register 180 and NT tag 182. The state machine 186 ensures the validity of data written to the NO and NT preload registers by repeatedly examining the contents of NO tag 178, NT tag 180 and NT (array) tag 184. The NO tag 178 and NT tag 180 respectively indicate the state of the array registers written to the NO preload register 176 and the NT preload register 180 at the time of the write. The NT (array) tag 184 indicate the present status of the array register written to the NT preload register 180. By selectively checking the state of the NO tag 178, the NT tag 182 and the NT (array) tag, invalid operations such as attempting to write the contents of an empty register to the NT preload register 180 are avoided. Further details as to the specific process by which the state machine 186 ensures the validity of the contents of the NO and NT preload registers 176 and 180 are set forth in that portion of the load/store pipe code, attached to the present application as Appendix "A", which details operation of the state machine 186. In the code set forth in Appendix "A", it should noted that the character "||" is defined as a logical OR, the character "&&" is defined as a logical AND and the character "!" is defined as a NOT.

Thus, there has been described and illustrated herein, an FPU having first and second preload registers to which operands for a next instruction may be written. By writing operands in advance of execution of a next instruction, performance of the FPU may be significantly enhanced. However, those skilled in the art should recognize that many modifications and variations besides those specifically mentioned may be made in the techniques described herein without departing substantially from the concept of the present invention. Accordingly, it should be clearly understood that the form of the invention described herein is exemplary only and is not intended as a limitation on the scope of the invention.

APPENDIX A

```
begin
  if(ls2_ld_state=='ld_ntos)
    case (ls2_stk_ctl)
      0:           ls1_tos_loaded=1;
      'SPINC:      ls1_tos_loaded=0;
      'SPINC2:     ls1_tos_loaded=0;
      default:     ls1_tos_loaded = 1;//SPDEC
    endcase
  else
    ls1_tos_loaded=ls2_tos_loaded;
    ls1_tos_loaded_d    =    (ls1_tos_loaded   ||
ec1_load_tos && (ls1_id_outval ||
  (ls1_stk_ctl_del !='SPDEC) && LS1_STK_CTL_MATCH))&&
              !(ls1_iq_valid && ls1_ld_id_out &&
ls1_stk_ctl == 'S
PDEC);
end
* fp_ph2_d   Load pipe state machine
//   ls2_nt_addr = ((ls1_stk_ctl    ==    'SPDEC)   &&
(!ls1_abort_del || ls1_id_out_
val || ls1_id_strobe))  ?ls1_ptos_addr+3'h7:
                                   ls1_ptos_addr;
//   ls2_no_addr=ls1_ptos_addr+ls1_oop_offset;
  ls2_ptos_addr=ls1_ptos_addr;
  case (ls1_stk_ctl)
    'SPINC:   ls2_ntos_addr=ls1_ntos_addr+3'h1;
    'SPINC2:  ls2_ntos_addr=ls1_ntos_addr+3'h2;
    'SPDEC:   ls2_ntos_addr=ls1_ntos_addr+3'h7;
    default:  ls2_ntos_addr=ls1_ntos_addr;
  endcase
  ls2_load_done = ls1_load_done &&
              !ec1_start &&
              !ls1_abort &&
              !ls1_rst;
  if((ls1_load_done    &&    !ls1_start_ena)    ||
ls1_reset)
      ls2_id_state = 'ld_wait;
    else if(!ls1_tos_loaded-d)
      ls2_ld_state = 'ld_nt,
    else if(!ls1_id_out_val)
      ls2_ld_state = 'ld_wait;
    else if(ls1_reg_flag_del && !(ls1_oop_loaded ||
ec1_load_oop))
      ls2_ld_state = 'ld_no;
    else if( ec1_load_enable &&
              !ls1_start_ena &&
              !ls1_abort &&
              !ls1_flush)
      begin
      ls2_ld_state = 'ld_ntos;
      ls2_load_done = 1;
      end
    else
      ls2_id_state = 'ld_wait;
    ls2_id_strobe = ls1_id_strobe;
  end
©1995 Cyrix Corporation
```

What is claimed is:

1. A floating point unit comprising:

a bus;

an array of registers for holding a series of input operands, said array of registers coupled to said bus;

an adder having a first input for receiving a first input operand for a first instruction from said array of registers, a second input for receiving a second input operand for said first instruction and an output for writing a result produced by executing said first instruction to said array of registers, said first input, said second input and said output coupled to said bus;

a first latch coupled to said bus and said first input of said adder, said first latch holding a first input operand for said first instruction;

a second latch coupled to said bus and said second input of said adder, said second latch holding a second input operand for said first instruction;

a first preload register coupled to said bus for holding a first input operand for a next instruction and having an output coupled to said first and second latches;

a second preload register coupled to said bus for holding a second input operand for said next instruction and having an output coupled to said first and second latches;

wherein said first input operand for said next instruction may be selectively placed in either said first or second latch;

wherein said second input operand for said next instruction may be selectively placed in either said first or second latch; and, a multiplier having a first input for receiving a first input operand for a first instruction from said array of registers, a second input for receiving a second input operand for said first instruction and an output for writing a result produced by executing said first instruction to said array of registers, said first input, said second input and said output coupled to said bus;

wherein said first operand placed in said first preload register and said second operand placed in said second preload register may be selectively propagated to said adder as said first and second input operands for said next instruction or to said multiplier as first and second input operands for a next instruction.

2. A floating point unit according to claim 1 wherein said first preload register further comprises a first tag for indicating status of a first register of said array of registers written to said first preload register.

3. A floating point unit according to claim 2 wherein said second preload register further comprises a second tag for indicating status of a second register of said array of registers written to said second preload register.

4. A floating point unit according to claim 3 and further comprising an array tag, coupled to said array of registers, for indicating present status of said second register of said array of registers.

5. A floating point unit according to claim 4 and further comprising a state machine, coupled to said first tag, said second tag and said array tag, for determining validity of said first and second input operands respectively placed in said first and second preload registers.

6. A microprocessor comprising:

a CPU core; and, a floating point unit, coupled to said CPU core, said floating point unit executing floating point instructions issued by said CPU core;

said floating point unit including:

a bus;

an array of registers for holding a series of input operands, said array of registers coupled to said bus;

an arithmetic operation unit having a first input for receiving a first input operand for a first instruction from said array of registers, a second input for receiving a second input operand for said first instruction and an output for writing a result produced by executing said first instruction to said array of registers, said first input, said second input and said output coupled to said bus;

a first latch coupled to said bus and said first input of said arithmetic operation unit, said first latch holding a first input operand for said first instruction;

a second latch coupled to said bus and said second input of said arithmetic operation unit, said second latch holding a second input operand for said first instruction;

a first preload register coupled to said bus for holding a first input operand for a next instruction and having an output coupled to said first and second latches;

a second preload register coupled to said bus for holding a second input operand for a next instruction and having an output coupled to said first and second latches;

wherein said first input operand for said next instruction may be selectively placed in either said first or second latch;

wherein said second input operand for said next instruction may be selectively placed in either said first or second latch;

a first preload register for holding a first input operand for a next instruction; and a second preload register for holding a second input operand for said next instruction;

said first and second preload registers coupled to said bus;

wherein upon completion of said first instruction, said first and second operands for said next instruction are propagated to said arithmetic operation unit to execute said next instruction.

7. A microprocessor according to claim 6 wherein said floating point unit further comprises an instruction queue for holding said series of pipelined floating point instructions received from said CPU core.

8. A computer, comprising:

a system bus;

a memory subsystem; and a microprocessor;

said memory subsystem and said microprocessor coupled to said system bus for bi-directional exchanges of address, data and control signals therebetween;

said microprocessor including:

a CPU core; and a floating point unit, coupled to said CPU core, said floating point unit executing floating point instructions issued by said CPU core;

said floating point unit including:

a bus;

an array of registers for holding a series of input operands, said array of registers coupled to said bus;

an arithmetic operation unit having a first input for receiving a first input operand for a first instruction from said array of registers, a second input for receiving a second input operand for said first instruction and an output for writing a result produced by executing said first instruction to said array of registers, said first input, said second input and said output coupled to said bus;

a first latch coupled to said bus and said first input of said arithmetic operation unit, said first latch holding a first input operand for said first instruction;

a second latch coupled to said bus and said second input of said arithmetic operation unit, said second latch holding a second input operand for said first instruction;

a first preload register coupled to said bus for holding a first input operand for a next instruction and having an output coupled to said first and second latches;

a second preload register coupled to said bus for holding a second input operand for a next instruction and having an output coupled to said first and second latches;

wherein said first input operand for said next instruction may be selectively placed in either said first or second latch;

wherein said second input operand for said next instruction may be selectively placed in either said first or second latch;

a first preload register for holding a first input operand for a next instruction; and a second preload register for holding a second input operand for said next instruction;

said first and second preload registers coupled to said bus; and, wherein upon completion of said first instruction, said first and second operands for said next instruction are propagated to said arithmetic operation unit to execute said next instruction.

9. A microprocessor according to claim 8 wherein said floating point unit further comprises an instruction queue for holding said series of pipelined floating point instructions received from said CPU core.

* * * * *